(12) United States Patent
Tau et al.

(10) Patent No.: US 7,981,967 B2
(45) Date of Patent: Jul. 19, 2011

(54) COMPOSITION SUITABLE FOR HIGH GLOSS BLOWN FILM AND FILMS MADE THEREFROM

(75) Inventors: Li-Min Tau, Lake Jackson, TX (US); Shaun Parkinson, Tarragona (ES); Jesus Nieto, Cambrils (ES)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 11/911,979

(22) PCT Filed: Apr. 13, 2006

(86) PCT No.: PCT/US2006/014114
§ 371 (c)(1),
(2), (4) Date: Oct. 19, 2007

(87) PCT Pub. No.: WO2006/115839
PCT Pub. Date: Nov. 2, 2006

(65) Prior Publication Data
US 2008/0207836 A1    Aug. 28, 2008

(51) Int. Cl.
*C08L 23/10* (2006.01)
*C08L 23/04* (2006.01)
*B32B 27/00* (2006.01)

(52) U.S. Cl. ........ 525/240; 525/191; 428/500; 428/515; 428/523

(58) Field of Classification Search .................. 428/409, 428/500, 515, 516, 523; 525/191, 240
See application file for complete search history.

(56) References Cited

U.S. PATENT DOCUMENTS

| | | | |
|---|---|---|---|
| 5,455,303 A * | 10/1995 | Panagopoulos et al. ........ 525/95 |
| 5,504,172 A | 4/1996 | Imuta et al. | |
| 6,086,967 A | 7/2000 | Whiteman et al. | |
| 6,428,901 B1 | 8/2002 | Agarwal et al. | |
| 6,960,635 B2 | 11/2005 | Stevens et al. | |
| 2002/0006482 A1 | 1/2002 | Falla et al. | |
| 2003/0204017 A1 * | 10/2003 | Stevens et al. ................... 525/53 |
| 2003/0216518 A1 * | 11/2003 | Tau et al. ....................... 525/191 |

FOREIGN PATENT DOCUMENTS

| | | |
|---|---|---|
| EP | 1844098 B1 | 8/2008 |
| WO | 0001745 A1 | 1/2000 |
| WO | 2005103123 A1 | 11/2005 |

OTHER PUBLICATIONS

Scholte, Th. G., et al., Journal of Applied Polymer Science, vol. 29, 3763-3782 (1984).
Otocka, E.P., et al., Macromolecules, 4, 507-514, 1971.
Iida, Takehiko, et al., Tetrahedron Letters, 42, pp. 4841-4844 (2001).
Randall, James C., JMS—Rev. Macromol. Chem, Phys., C29(2&3), pp. 201-317 (1989).
The Encyclopedia of Chemical Technology, Kirk-Othmer, 3rd Ed., John Wiley & Sons, NY, 1981, vol. 16, pp. 402-420.
The Encyclopedia of Chemical Technology, Kirk-Othmer, 3rd Ed., John Wiley & Sons, NY, 1981, vol. 18, pp. 191-192.

* cited by examiner

*Primary Examiner* — Irina S Zemel
*Assistant Examiner* — Jeffrey Lenihan
(74) *Attorney, Agent, or Firm* — Whyte Hirschboeck Dudek SC (57) ABSTRACT

The invention is directed to a composition suitable for high gloss air quenched blown films. The films are comprised of from 2 to 15 percent by weight of a substantially isotactic propylene-based copolymer having a melt flow rate of at least 5 g/10 minutes and having from 8 to 21 mole percent units derived from an alpha olefin; and from 85 to 98 percent by weight of an ethylene-based copolymer having a melt index of from 0.1 to 9 g/10 minutes. An air quenched blown film made from the inventive composition exhibits a value for gloss greater than the value for gloss exhibited by an air quenched blown film made solely from the ethylene-based copolymer.

10 Claims, 3 Drawing Sheets

COMPOSITION SUITABLE FOR HIGH GLOSS BLOWN FILM AND FILMS MADE THEREFROM

FIELD

This invention pertains to thermoplastic compositions suitable for use in the manufacture of high gloss air-quenched blown films. More particularly, the invention pertains to polyolefin blends with a majority of an ethylene-based polymer or copolymer and a small amount of a propylene-based copolymer. Additionally, the invention pertains to single layer and/or multilayer air-quenched blown films incorporating the inventive composition.

OBJECTS OF THE INVENTION

One object of the invention is to provide a composition containing a majority of an ethylene-based copolymer and also containing a propylene-based copolymer. The composition capable of being made into an air quenched blown film exhibiting higher values for gloss than an air quenched blown film manufactured solely from the ethylene-based copolymer.

Another object of the invention is to provide a single layer air quenched blown film made from the composition described above that provides high gloss while not unduly diminishing the physical properties of the film (such as tear and toughness) as compared to a film made solely from the ethylene-based copolymer.

Still another object of the invention is to provide a multi layer air quenched blown film, where one of the layers provides a high gloss while at the same time being compatible with the other layers with no need of added compatibilizer and/or tie layers.

A further object of the invention is to provide a single and/or multi layer air quenched blown film where one of the layers provides high gloss while also providing excellent heat sealing behavior (in particular, a low hot tack initiation temperature).

Another further object of the invention is to provide a composition suitable for air quenched blown films that will provide one and/or all of the above benefits while also being capable of being converted into a blown film on typically available blown film equipment at commercially acceptable rates.

A final object of the invention is to provide a composition suitable for air quenched blown films that exhibit higher gloss and lower hot tack initiation temperature, while not unduly diminishing the physical properties of the film (such as tear and toughness (as exhibited by dart impact)) as compared to a film made solely from the ethylene-based copolymer. Preferably, the film made from the inventive composition also provides lower values of haze than a film made solely from the ethylene-based copolymer.

SUMMARY

In a first embodiment, the invention is a composition suitable for use in an air quenched blown film the composition comprising:
A. from 2 to 15% by weight of a propylene-based copolymer having substantially isotactic propylene sequences, the propylene-based copolymer comprising propylene and from about 8 to about 21 mole percent units derived from an alpha olefin, the propylene-based copolymer having a melt flow rate of at least 5 g/10 min; and
B. from about 85 to about 98% by weight of a ethylene-based copolymer having a melt index of from 0.1 to 9 g/10,
wherein an air quenched blown film made from the composition exhibits a value for gloss greater than a value for gloss exhibited by an air quenched blown film made solely from component B.

In a second embodiment, the invention is a composition suitable for use in an air quenched blown film, the composition comprising:
A. from 2 to 15% by weight of a propylene-based copolymer having substantially isotactic propylene sequences, the propylene-based copolymer comprising propylene and from about 6 to about 15 wt % of units derived from ethylene, the propylene-based copolymer having a melt flow rate of at least 5 g/10 min; and
B. from about 85 to about 98% by weight of an ethylene/alpha olefin copolymer having a melt index of from about 0.1 to 9 g/10 min.

In a third embodiment, the invention is a air quenched blown film, the film comprising:
at least one layer comprising:
(A) from 2-15% by weight of a propylene-based copolymer having substantially isotactic propylene sequences, the propylene-based copolymer comprising propylene and from about 8 to about 21 mol % of units derived from an alpha olefin, the propylene-based copolymer, preferably a propylene-ethylene copolymer having a melt flow rate of at least 5 g/10 min; and
(B) from about 85 to about 98% by weight of a ethylene-based copolymer having a melt index of from 0.1 to 9 g/10 min,
wherein the film exhibits a gloss of greater than the gloss exhibited by a film made from the ethylene-based copolymer of B.

Preferably, in the above embodiments, a film made from the inventive composition further exhibits a value for hot tack initiation temperature lower than the hot tack initiation temperature exhibited by a film made solely from the ethylene-based copolymer of component B, preferably at least 5° C. lower, more preferably at least 10° C. lower. The film made from the inventive composition also preferably exhibits a gloss relatively at least 20 percent higher than the gloss exhibited by a film made from the ethylene-based copolymer, more preferably at least 30 relative percent higher. The film made from the inventive composition further preferably exhibits comparable physical properties of Elmendorf tear strength (in both the cross direction (CD) and machine direction (MD)) and of dart impact as exhibited by an air quenched blown film made solely from component B. Elmendorf tear strength is considered to be comparable if the value obtained for a film made from the inventive composition (under similar conditions with a similar film design) is within 15 relative percent of the value of Elmendorf tear strength exhibited by a film made from component B alone. Dart impact is considered to be comparable if the value obtained for the film made from the inventive composition (under similar conditions with a similar film design) is within 20 relative percent of the value of dart impact exhibited by a film made from component B alone. Preferably, a film made from the inventive composition exhibits a lower hot tack initiation temperature than an air quenched blown film made solely from component B. Preferably the film made from the inventive composition also exhibits a lower value for haze than an air quenched blown film made solely from component B.

In an fourth alternate embodiment, the invention is a composition suitable for use in an air quenched blown film, the composition comprising:

A. from 16 to 40% by weight of a propylene-based copolymer having substantially isotactic propylene sequences, the propylene-based copolymer comprising propylene and from about 8 to about 21 mole percent units derived from an alpha olefin, the propylene-based copolymer having a melt flow rate of at least 5 g/10 min; and B. from about 60 to about 84% by weight of a ethylene-based copolymer having a melt index of from 0.1 to 9 g/10, wherein an air quenched blown film made from the composition exhibits a value for gloss greater than a value for gloss exhibited by an air quenched blown film made solely from component B and exhibits a value for hot tack initiation temperature lower than the value for hot tack initiation temperature exhibited by an air quenched blown film made solely from component B. Preferably, in this embodiment, the hot tack initiation temperature is at least 15 degrees Celsius lower than the hot tack initiation temperature exhibited by an air quenched blown film made solely from Component B, more preferably at least 20° C. lower than the hot tack initiation temperature exhibited by an air quenched blown film made solely from Component B, and in some instances at least 30° C. lower.

DETAILED DESCRIPTION

Ethylene-Based Copolymer:

The ethylene-based copolymer (often referred to as a "polyethylene") used in the blend preferably is a copolymer of units derived from ethylene and an alpha-olefin comonomer. The preferred alpha-olefin comonomers are C3 to C10 alpha-olefins, more preferably C4-C8 alpha-olefins, further more preferably C4, C5, C6 and C8 alpha-olefins, most preferably 1-butene, 1-hexene and 1-octene. Due to their superior film strength properties (such as tear resistance, puncture resistance, holding force and dart impact strength), the polyethylene copolymers preferably are linear polyethylene made using gas phase, solution, or slurry polymer manufacturing processes, as known to one of ordinary skill in the art. Examples of polyethylene useful in the invention are ethylene/1-octene substantially linear copolymers available from The Dow Chemical Company under the trademark "AFFINITY", ethylene/1-octene and ethylene/1-hexene linear copolymers available from The Dow Chemical Company under the trademark "DOWLEX", ethylene/1-octene linear copolymers available from The Dow Chemical Company under the trademark "ATTANE", ethylene/1-octene enhanced polyethylene available from The Dow Chemical Company under the trademark "ELITE", ethylene-based copolymers available from Polimeri Europa under the trademarks "CLEARFLEX" and "FLEXIRENE", ethylene/alpha-olefin copolymers available from ExxonMobil Chemical under the trademarks "Escorene", "Exact" and "Exceed", ethylene/alpha-olefin copolymers available from BP Petrochemicals under the trademark "INNOVEX", ethylene/alpha-olefin copolymers available from Basell under the trademarks "TUFLEXEN" and "LUPOLEX", ethylene/alpha-olefin copolymers available from DSM under the trademark "STAMYLEX", and ethylene/alpha-olefin copolymers available from Sabic under the trademark "LADENE.

The melt index ("MI") of the polyethylene is from 0.1 to 9 g/10 min, more preferably from 0.3 to 6 g/10 min, further more preferably from 0.5 to 4 g/10 min, most preferably from 1 to 3 g/10 min. Melt index (MI) measurement is performed according to ASTM D-1238, Condition 190° C./2.16 kilogram (kg) weight, formerly known as "Condition E" and also known as I2. Melt index is inversely proportional to the molecular weight of the polymer. Thus, the higher the molecular weight, the lower the melt index, although the relationship is not linear.

Propylene-Based Copolymer:

The propylene-based copolymer comprises from 2 to 15 percent by weight of the total polymer composition capable of being utilized for the blown film or blown film layer of interest. Preferably, the propylene-based copolymer comprises from 3 to 13 percent by weight of the total composition, more preferably from 4 to 12 percent by weight of the total polymer composition, further more preferably from 5 to 10 percent by weight of the total polymer composition.

The propylene-based copolymer of the current invention is characterized as having substantially isotactic propylene sequences. "Substantially isotactic propylene sequences" and similar terms mean that the sequences have an isotactic triad (mm) measured by $^{13}$C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by $^{13}$C NMR spectra. NMR spectra are determined as described below.

The propylene-based copolymer of the invention typically has a melt flow rate (MFR) of at least 5 g/10 min.

In order to provide enhanced segregation to the surface the copolymer has a crystallinity preferably has less than 40 percent by weight (a heat of fusion of less than 69 Joules/gram), more preferably less than 30 percent by weight (a heat of fusion of less than 51 Joules/gram), and preferably has a crystallinity of at least 15 percent by weight (a heat of fusion at least 24.8 Joules/gram) determined in accordance with DSC method described below.

The propylene-based copolymer of the invention is comprised from units derived from propylene and from polymeric units derived from alpha-olefins. The preferred comonomers utilized to manufacture the propylene-based copolymer are C2 and C4 to C10 alpha-olefins, preferably C2, C4, C6 and C8 alpha-olefins, most preferably ethylene.

The propylene-based copolymer of the invention preferably comprises from 8 to 21 mole percent units derived from the alpha-olefin comonomer, more preferably from 10 to 18 mole percent units derived from the alpha-olefin comonomer. When ethylene is the comonomer, the propylene-based copolymer preferably comprises from 6 to 15 weight percent units derived from ethylene, more preferably from 7 to 13 weight percent units derived from ethylene, further more preferably from 8 to 12 weight percent units derived from ethylene, most preferably from 9 to 11 weight percent units derived from ethylene.

$^{13}$C NMR spectroscopy is one of a number of techniques known in the art of measuring comonomer incorporation into a polymer and measuring isotactic triad levels in propylene-based copolymers. An example of this technique is described for the determination of comonomer content for ethylene/α-olefin copolymers in Randall (Journal of Macromolecular Science, Reviews in Macromolecular Chemistry and Physics, C29 (2 & 3), 201-317 (1989)). The basic procedure for determining the comonomer content of an olefin interpolymer involves obtaining the $^{13}$C NMR spectrum under conditions where the intensity of the peaks corresponding to the different carbons in the sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomer. The mole % comonomer can be determined by the ratio of the integrals corresponding to the number of moles of comonomer to the integrals corresponding to the number of moles of all of the monomers in the interpolymer, as described in Randall, for example.

The data is collected using a Varian UNITY Plus 400 MHz NMR spectrometer, corresponding to a $^{13}$C resonance frequency of 100.4 MHz. Acquisition parameters are selected to ensure quantitative $^{13}$C data acquisition in the presence of the relaxation agent. The data is acquired using gated $^{1}$H decoupling, 4000 transients per data file, a 7 sec pulse repetition delay, spectral width of 24,200 Hz and a file size of 32K data points, with the probe head heated to 130° C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150° C. with periodic refluxing initiated by heat gun.

Following data collection, the chemical shifts are internally referenced to the mmmm pentad at 21.90 ppm.

For propylene-ethylene copolymers, the following procedure is used to calculate the mole percent ethylene in the polymer. Integral regions are determined as follows:

TABLE A

Integral Regions for Determining % Ethylene

| Region designation | PPM |
| --- | --- |
| A | 44-49 |
| B | 36-39 |
| C | 32.8-34 |
| P | 31.0-30.8 |
| Q | Peak at 30.4 |
| R | Peak at 30 |
| F | 28.0-29.7 |
| G | 26-28.3 |

TABLE A-continued

Integral Regions for Determining % Ethylene

| Region designation | PPM |
| --- | --- |
| H | 24-26 |
| I | 19-23 |

Region D is calculated as D = P × (G × Q)/2. Region E = R + Q + (G × Q)/2.

TABLE E

Calculation of Region D

PPP = (F + A − 0.5 D)/2
PPE = D
EPE = C
EEE = (E − 0.5 G)/2
PEE = G
PEP = H
Moles P = sum P centered triads
Moles E = sum E centered triads
Moles P = (B + 2A)/2
Moles E = (E + G + 0.5B + H)/2

C2 values are calculated as the average of the two methods above (triad summation and algebraic) although the two do not usually vary. The weight percent of units derived from ethylene in the propylene-ethylene copolymers can be calculated from the values for mole percent ethylene by one of ordinary skill in the art.

In a particularly preferred aspect of the invention, the propylene-based copolymer utilized in the invention comprises a propylene-ethylene copolymer made using a nonmetallocene, metal-centered, heteroaryl ligand catalyst as described in U.S. patent application Ser. No. 10/139,786 filed May 5, 2002 (WO 03/040201), which are incorporated by reference herein in their entirety for their teachings regarding such catalysts. For such catalysts, the term "heteroary" includes substituted heteroaryl. An example of such a nonmetallocene, metal-centered, heteroaryl ligand catalyst is Catalyst A described in the Examples. The propylene-ethylene copolymers made with such nonmetallocene, metal-centered, heteroaryl ligand catalyst exhibit a unique regio-error. The regio-error is identified by $^{13}$C NMR peaks corresponding at about 14.6 and about 15.7 ppm, which are believed to be the result of stereo-selective 2,1-insertion errors of propylene units into the growing polymer chain. In this particularly preferred aspect, these peaks are of about equal intensity, and they typically represent about 0.02 to about 7 mole percent of the propylene insertions into the homopolymer or copolymer chain.

Figure 1:
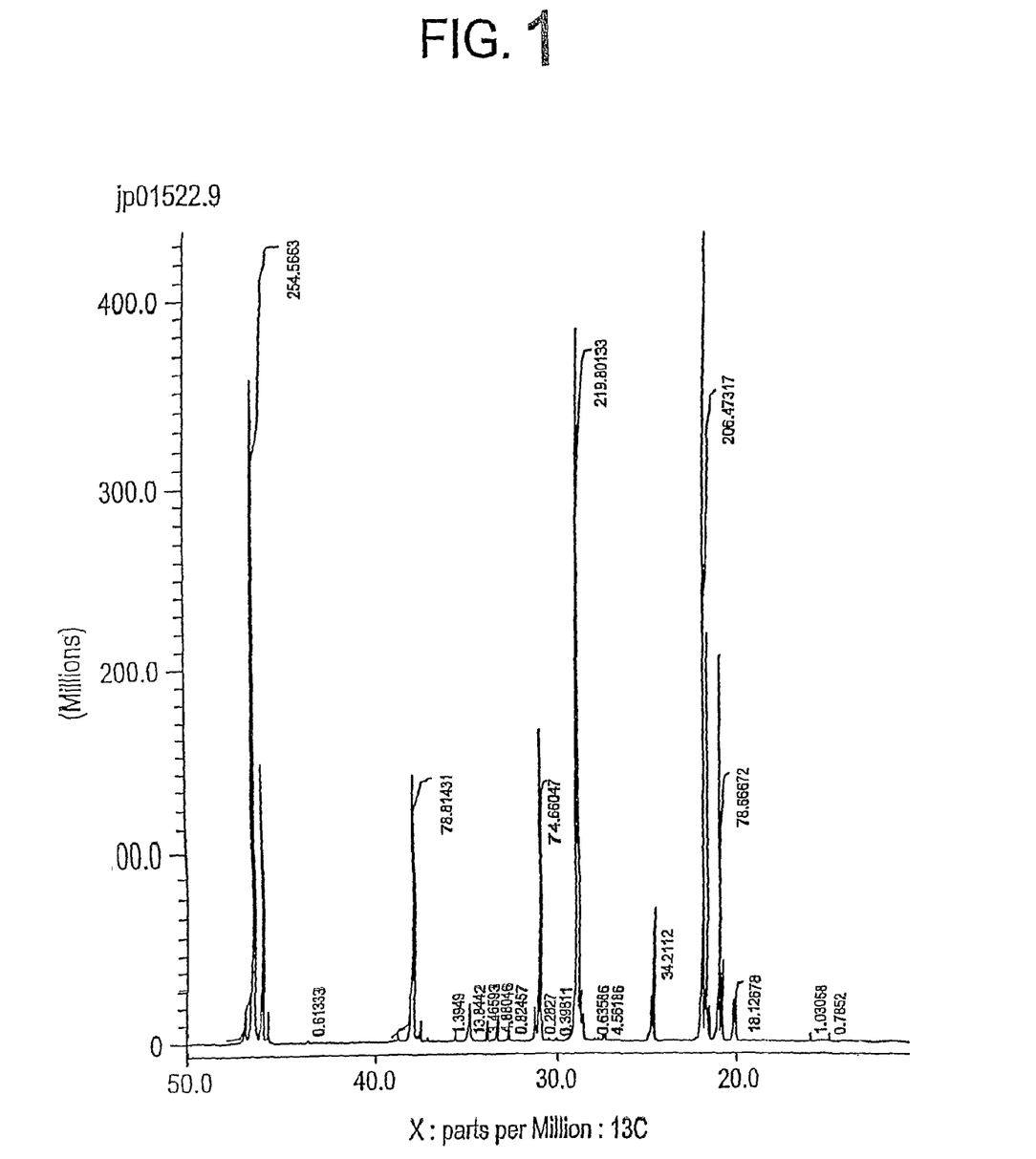
FIG. 1 shows the $^{13}$C NMR Spectrum of a propylene-ethylene copolymer (made with an activated non-metallocene, metal centered, heteroaryl ligand catalyst similar to Catalyst A), which is similar to the propylene-ethylene copolymers described in the Examples.
Figure 2:
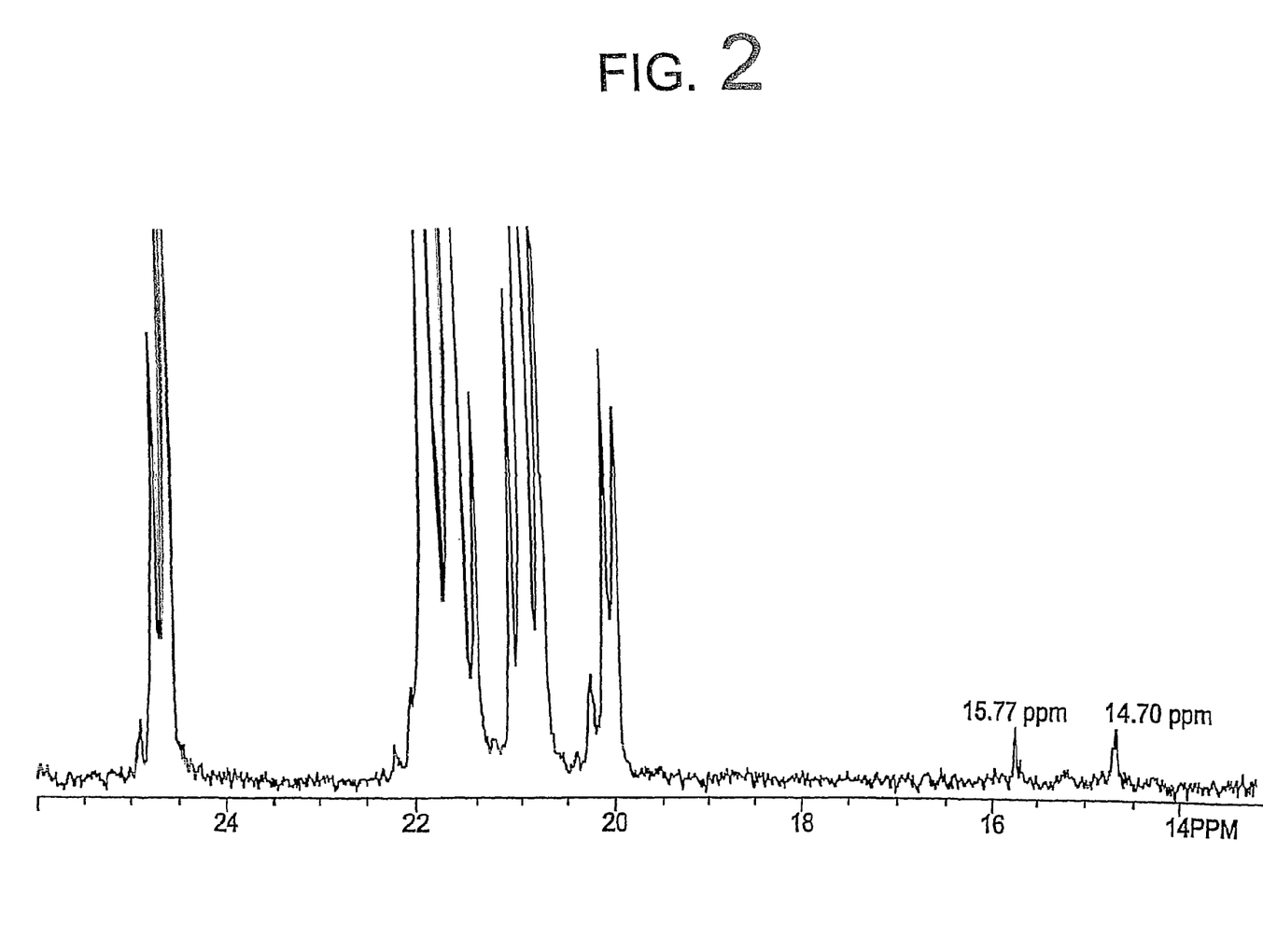
FIG. 2 shows the $^{13}$C NMR Spectrum of same propylene-ethylene copolymer as FIG. 1. However, the spectrum is shown with an expanded Y-axis scale relative to FIG. 1, in order to more clearly show the regio-error peaks at about 14.6 and 15.7 ppm.
Figure 3:
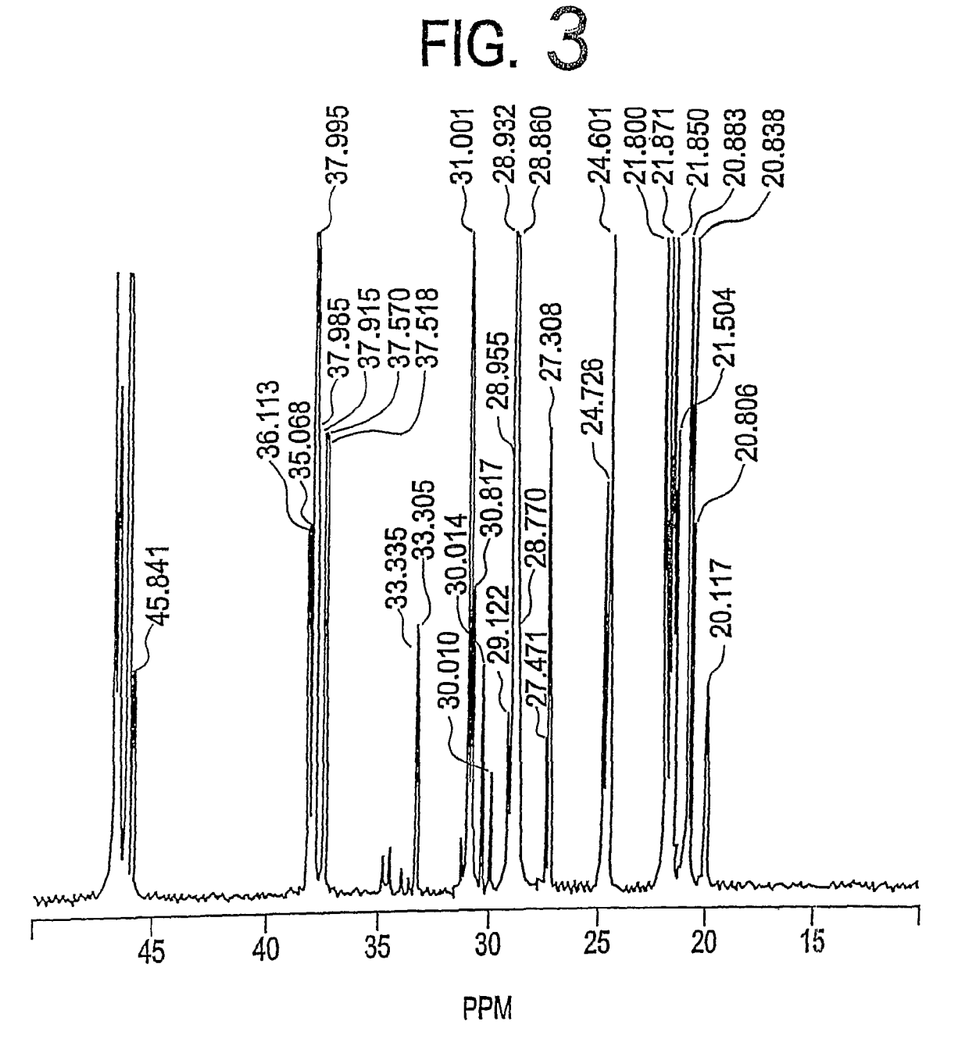
FIG. 3 shows the $^{13}$C NMR Spectrum of a propylene-ethylene copolymer prepared using a metallocene catalyst. The figure demonstrates the absence of regio-error peaks in the region around 15 ppm for a propylene-ethylene copolymer made with a metallocene catalyst.

A comparison of several $^{13}$C NMR spectra further illustrates the unique regio-errors of propylene-ethylene copolymers preferably utilized in the particularly preferred aspect of the invention. FIGS. 1 and 2 are the spectra of the propylene-ethylene copolymers similar to the propylene-ethylene copolymers utilized in the Examples. The spectrum of each polymer reports a high degree of isotacticity (isotactic triad (mm) measured by $^{13}$C NMR of greater than 0.94) and the unique regio-errors of these propylene-ethylene based copolymers. The $^{13}$C NMR spectrum of FIG. 3 is that of a propylene-ethylene copolymer prepared using a metallocene catalyst. This spectrum does not report the regio-error (around 15 ppm) characteristic of the most preferred propylene-ethylene copolymers used in this invention.

Isotacticity at the triad level (mm) is determined from the integrals of the mm triad (22.70-21.28 ppm), the mr triad (21.28-20.67 ppm) and the rr triad (20.67-19.74). The mm isotacticity is determined by dividing the intensity of the mm triad by the sum of the mm, mr, and rr triads. For ethylene copolymers the mr region is corrected by subtracting 37.5-39 ppm integral. For copolymers with other monomers that produce peaks in the regions of the mm, mr, and rr triads, the integrals for these regions are similarly corrected by subtracting the intensity of the interfering peak using standard NMR techniques, once the peaks have been identified. This can be accomplished, for example, by analysis of a series of copolymers of various levels of monomer incorporation, by literature assignments, by isotopic labeling, or other means which are known in the art.

Preferably, the propylene-based copolymer has a molecular weight distribution (MWD), defined as weight average molecular weight divided by number average molecular weight (Mw/Mn) of 3.5 or less.

Molecular weight distribution of the polymers is determined using gel permeation chromatography (GPC) on a Polymer Laboratories PL-GPC-220 high temperature chromatographic unit equipped with four linear mixed bed columns (Polymer Laboratories (20-micron particle size)). The oven temperature is at 160° C. with the autosampler hot zone at 160° C. and the warm zone at 145° C. The solvent is 1,2,4-trichlorobenzene containing 200 ppm 2,6-di-t-butyl-4-methylphenol. The flow rate is 1.0 milliliter/minute and the injection size is 100 microliters. About 0.2% by weight solutions of the samples are prepared for injection by dissolving the sample in nitrogen purged 1,2,4-trichlorobenzene containing 200 ppm 2,6-di-t-butyl-4-methylphenol for 2.5 hrs at 160° C. with gentle mixing.

The molecular weight determination is deduced by using ten narrow molecular weight distribution polystyrene standards (from Polymer Laboratories, EasiCal PS1 ranging from 580-7,500,000 g/mole) in conjunction with their elution volumes. The equivalent propylene-ethylene copolymer molecular weights are determined by using appropriate Mark-Houwink coefficients for polypropylene (as described by Th. G. Scholte, N. L. J. Meijerink, H. M. Schoffeleers, and A. M. G. Brands, J. Appl. Polym. Sci., 29, 3763-3782 (1984)) and polystyrene (as described by E. P. Otocka, R. J. Roe, N.Y. Hellman, P. M. Muglia, Macromolecules, 4, 507 (1971)) in the Mark-Houwink equation:

$$\{N\}=KM^a$$

where $K_{pp}=1.90E-04$, $a_{pp}=0.725$ and $K_{ps}=1.26E-04$, $a_{ps}=0.702$.

Differential Scanning Calorimetry

Differential scanning calorimetry (DSC) is a common technique that can be used to examine the melting and crystallization of semi-crystalline polymers. General principles of DSC measurements and applications of DSC to studying semi-crystalline polymers are described in standard texts (e.g., E. A. Turi, ed., *Thermal Characterization of polymeric Materials*, Academic Press, 1981). In the particularly preferred aspect of the invention, propylene-ethylene copolymers are utilized in the invention and are characterized by a DSC curve with a $T_{me}$ that remains essentially the same and a $T_{max}$ that decreases as the amount of unsaturated comonomer in the copolymer is increased. $T_{me}$ means the temperature at which the melting ends and $T_{max}$ means the peak melting temperature, both as determined by one of ordinary skill in the art from DSC analysis using data from the final heating step.

Differential Scanning Calorimetry (DSC) analysis is determined using a model Q1000 DSC from TA Instruments, Inc. Calibration of the DSC is done as follows. First, a baseline is obtained by running the DSC from −90° C. to 290° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to −30° C. at a cooling rate of 10° C./min. The sample is kept isothermally at −30° C. for 2 minutes and heated to 30° C. at a heating rate of 10° C./min. The onset of melting is determined and checked to be within 0.5° C. from 0° C.

The propylene-based copolymers samples are pressed into a thin film at a temperature of 190° C. About 5 to 8 mg of sample is weighed out and placed in the DSC pan. The lid is crimped on the pan to ensure a closed atmosphere. The sample pan is placed in the DSC cell and the heated at a high rate of about 100° C./min to a temperature of about 30° C. above the melt temperature. The sample is kept at this temperature for about 3 minutes. Then the sample is cooled at a rate of 10° C./min to −40° C., and kept isothermally at that temperature for 3 minutes. Consequently the sample is heated at a rate of 10° C./min until complete melting. The resulting enthalpy curves are analyzed for peak melt temperature, onset and peak crystallization temperatures, heat of fusion and heat of crystallization, $T_{me}$, and any other DSC analyses of interest. The factor that is used to convert heat of fusion into nominal weight % crystallinity is 165 J/g=100 weight % crystallinity. With this conversion factor, the total crystallinity of a propylene-based copolymer (units: weight % crystallinity) is calculated as 100% times heat of fusion divided by 165 J/g.

The melt flow rate ("MFR") of the propylene-based copolymer useful for invention typically has a melt flow rate of at least 5 g/10 min, preferably at least 6 g/10 min, more preferably at least 7 g/10 min, most preferably at least 8 g/10 min. Melt flow rate (MFR) measurement is performed according to ASTM D-1238, Condition 230° C./2.16 kilogram (kg) weight. As with the melt index, the melt flow rate is inversely proportional to the molecular weight of the polymer. Thus, the higher the molecular weight, the lower the melt flow rate, although the relationship is not linear.

Air Quenched Blown Film:

Suitable air quenched blown film processes are described, for example, in *The Encyclopedia of Chemical Technology* Kirk-Othmer, Third Edition, John Wiley & Sons, New York, 1981, Vol. 16, pp. 416-417 and Vol. 18, pp. 191-192. Suitable coextrusion techniques and requirements are known to one of ordinary skill in the art.

Blending of the Components:

The compositions incorporated into the film can be made by: (a) dry Blending of the component pellets; (b) direct feeding of the component pellets via a blender system (volumetric or gravimetric) mounted on an extruder; (c) compounding the pellet components in a compounding extruder producing pellets of compounded product; and/or (d) any other blending techniques known to one of ordinary skill in the art.

EXAMPLES

Catalyst A

Synthesis of Catalyst A
Hafnium, [N-[2,6-bis(1-methylethyl)phenyl]-α-[2-(1-methylethyl)phenyl]-6-(1-naphthanlenyl-κ-$C^2$)-2-pyridinemethanaminato(2-)-κ$N^1$, κ$N^2$]dimethyla) 2-Formyl-6-bromopyridine. This compound is synthesized according to literature procedures, *Tetrahedron Lett.*, (2001) 42, 4841.

b) 6-Bromo-2-(2,6-diisopropylphenyl)iminopyridine). A dry, 500 mL 3-neck round bottom flask is charged with a solution of 2-formyl-6-bromopyridine (72.1 g, 383 mmol) and 2,6-diisopropylaniline (72.5 g, 383 mmol) in 500 mL of anhydrous toluene containing 0.3 nm pore size molecular sieves (6 g) and 80 mg of p-TsOH. The reactor is equipped with a condenser, an over head mechanical stirrer and a thermocouple well. The mixture is heated to 70° C. under $N_2$ for 12 h. After filtration and removal of the volatiles under reduced pressure, a brown oil is isolated. Yield was 109 g, 81.9 percent.

GC/MS 346 ($M^+$), 331, 289, 189, 173, 159, 147, 131, 116, 103, 91, 78.

c) 6-(1-Naphthyl)-2-[(2,6-diisopropylphenyl)imino]pyridine. Naphthylboronic acid (54.5 g, 316 mmol) and $Na_2CO_3$ (83.9 g, 792 mmol) are dissolved into 200 mL of degassed 1:1$H_2O$/EtOH. This solution is added to a toluene solution (500 mL) of 6-bromo-2-(2,6-diisopropylphenyl)-iminopyridine (109 g, 316 mmol). Inside of a dry box, 1 g (0.86 mmol) of tetrakis(triphenyl-phosphine)palladium(0) is dissolved in 50 mL of degassed toluene. The solution is removed from the dry box and charged into the $N_2$ purged reactor. The biphasic solution is vigorously stirred and heated to 70° C. for 4-12 hours. After cooling to room temperature, the organic phase is separated, the aqueous layer is washed with toluene (3×75 mL), the combined organic extracts are washed with $H_2O$ (3×200 mL) and dried over $MgSO_4$. After removing the volatiles under reduced pressure, the resultant light yellow oil is purified via recrystallization from methanol to give a yellow solid. Yield 109 g, 87.2 percent; mp 142-144° c.

$^1$H NMR (CDCl$_3$) δ 1.3 (d, 12H), 3.14 (m, 2H), 7.26 (m, 3H), 7.5-7.6 (m, 5H), 7.75-7.8 (m, 3H), 8.02 (m 1H), 8.48 (m, 2H).

$^{13}$C NMR (CDCl$_3$) δ 23.96, 28.5, 119.93, 123.50, 124.93, 125.88, 125.94, 126.49, 127.04, 127.24, 128.18, 128.94, 129.7, 131.58, 134.5, 137.56, 137.63, 138.34, 148.93, 154.83, 159.66, 163.86.

GC/MS 396 ($M^+$), 380, 351, 337, 220, 207, 189, 147.

d) 2-Isopropylphenyl lithium. Inside an inert atmosphere glovebox, n-butyl lithium (52.5 mmol, 21 mL of 2.5M in hexanes) is added by addition funnel over a period of 35-45 min to an ether solution (50 mL) of 2-isopropyl bromobenzene (9.8 g, 49.2 mmol). After the addition is complete, the mixture is stirred at ambient temperature for 4 h. Then, the ether solvent is removed under vacuum overnight. The next day hexane is added to the remaining white solid and the mixture filtered, washed with additional hexane, and then vacuum dried. 2-Isopropylphenyl lithium (4.98 g, 39.52 μmmol) is collected as a bright white powder. A second crop of product (0.22 g) is later obtained from a second filtration of the original hexane filtrant.

$^1$H NMR (d$_8$-THF) δ 1.17 (d, J=6.8 Hz, 6H), 2.91 (sept, J=6.8, 1H), 6.62-6.69 (multiplets, 2H), 6.77 (d, J=7.3 Hz, 1H), 7.69 (multiplet, 1H).

$^{13}$C NMR (d$_8$-THF) δ 25.99, 41.41, 120.19, 122.73, 122.94, 142.86, 160.73, 189.97.

e) 2-pyridinemethanamine, N-[2,6-bis(1-methylethyl)phenyl]-α-[2-(1-methylethyl)phenyl]-6-(1-naphthanlenyl). The imine, 6-(1-naphthyl)-2-[(2,6-diisopropylphenyl)imino] pyridine of step c) (2.20 g, 5.6 mmol) is magnetically stirred as a slurry in 60-70 mL of dry ether under a nitrogen atmosphere. An ether solution of 2-isopropylphenyl lithium (1.21 g, 9.67 mmol in 25 mL dry ether) is added slowly using a syringe over a period of 4-5 min. After the addition is complete, a small sample is removed, quenched with 1N $NH_4$Cl and the organic layer analyzed by high pressure liquid chromatography (HPLC) to check for complete consumption of starting material. The remainder of the reaction is quenched by the careful, slow addition of 1N $NH_4$Cl (10 mL). The mixture is diluted with more ether and the organic layer washed twice with brine, dried ($Na_2SO_4$), filtered, and stripped of solvent under reduced pressure. The crude product obtained as a thick red oil (2.92 g; theoretical yield=2.87 g) is used without further purification.

$^1$H NMR (CDCl$_3$) δ 0.96 (d, J=6.6 Hz, 3H), 1.006 (d, J=6.8 Hz, 3H), 1.012 (d, J=6.8 Hz, 6H), 1.064 (d, J=6.8 Hz, 6H), 3.21-3.34 (multiplets, 3H), 4.87 (br s, NH), 5.72 (s, 1H), 6.98 (d, J=7.6 Hz, 1H) 7.00-7.20 (multiplets, 7H), 7.23-7.29 (multiplets, 4H), 7.51 (d, J=7.1 Hz 1H), 7.60-7.65 (multiplets, 2H), 7.75 (multiplet, 1H), 8.18 (multiplet, 1H).

$^{13}$C NMR (CDCl$_3$) δ 23.80, 24.21, 24.24, 24.36, 28.10, 28.81, 67.08, 120.20, 122.92, 123.96, 124.42, 125.35, 125.81, 126.01, 126.28, 126.52, 126.58, 126.65, 127.80, 128.52, 128.62, 129.25, 131.82, 134.52, 136.81, 138.82, 140.94, 143.37, 143.41, 146.66, 159.05, 162.97.

f) Hafnium, [N-[2,6-bis(1-methylethyl)phenyl]-α-[2-(1-methylethyl)phenyl]-6-(1-naphthanlenyl-κ-$C^2$)-2-pyridinemethanaminato(2-)-κ$N^1$, κ$N^2$]dimethyl- A glass jar is charged with 8.89 mmol of the ligand from step e) dissolved in 30 mL toluene. To this solution is added 8.98 mmol of n-BuLi (2.5 M solution in hexanes) by syringe. This solution is stirred for 1 hour, then 8.89 mmol of solid HfCl$_4$ are added. The is capped with an air-cooled reflux condenser and the mixture is heated at reflux for 1 hour. After cooling, 31.1 mmol of MeMgBr (3.5 equivalents, 3.0 M solution in diethyl ether) are added by syringe and the resulting mixture stirred overnight at ambient temperature. Solvent (toluene, hexanes and diethyl ether) is removed from the reaction mixture using a vacuum system attached to the drybox. Toluene (30 mL) is added to the residue and the mixture filtered, and the residue (magnesium salts) is washed with additional toluene (30 mL). Solvent is removed by vacuum from the combined toluene solution, and hexane is added, then removed by vacuum. Hexane is again added and the resulting slurry is filtered and the product washed with pentane to give the desired product as a yellow powder.

$^1$H NMR (C$_6$D$_6$): δ 8.58 (d, J=7.8 Hz, 1H), 8.25 (d, J=8.4 Hz, 1H), 7.82 (d, J=7.5 Hz, 1H), 7.72 (d, J=6.9 Hz, 1H), 7.50 (d, J=8.1 Hz, 1H), 7.36-7.27 (multiplets, 3H), 7.19-6.99 (multiplets, 7H), 6.82 (t, J=8.1 Hz, 1H), 6.57 (s, 1H), 6.55 (d, J=7.8 Hz, 1H), 3.83 (septet, J=6.9 Hz, 1H), 3.37 (septet, J=6.9 Hz, 1H), 2.89 (septet, J=6.9 Hz, 1H), 1.38 (d, J=6.6 Hz, 3H), 1.37 (d, J=6.9 Hz, 3H), 1.17 (d, J=6.9 Hz, 3H), 1.15 (d, J=7.2 Hz, 3H), 0.96 (s, 3H), 0.70 (s, 3H), 0.69 (d, J=5.4 Hz, 3H), 0.39 (d, J=6.9 Hz, 3H).

General Continuous Loop Solution Propylene-Ethylene Copolymerization Procedure

Propylene-Ethylene Copolymers are Made According to the Following Procedure. Catalyst A.

The polymerization process is exothermic. There are ~900 BTU released per pound of propylene polymerized and ~1,500 BTU released per pound of ethylene polymerized. The primary process design consideration is how to remove the heat of reaction. The propylene-ethylene copolymers are produced in a low-pressure, solution polymerization loop reactor, made up of a 3" loop pipe plus two heat exchanges, the total volume of which is 31.4 gals. Solvent and monomer (propylene) are injected into the reactor as a liquid. The comonomer (ethylene) gas is fully dissolved in the liquid solvent. The feed is cooled to 5° C. before injection into the reactor. The reactor operates at polymer concentrations equal to 18 wt %. The adiabatic temperature rise of the solution accounts for some of the heat removal from the polymerization reaction. Heat exchangers within the reactor are utilized to remove the remaining heat of reaction, allowing for reactor temperature control at 105° C.

The solvent used is a high purity iso-paraffinic fraction purchased from Exxon called Isopar E. Fresh propylene is passed through a bed of Selexsorb COS for purification before mixing with the recycle stream (contains solvent, propylene, ethylene, and hydrogen). After mixing with the recycle stream, the combined stream is passed through a bed of 75 wt % Molecular Sieve 13× and 25 wt % Selexsorb CD for further purification before using a high pressure (700 psig) feed pump to pump the contents to the reactor. Fresh ethylene is passed through a Selexsorb COS bed for purification before compressing the stream to 750 psig. Hydrogen (a telogen used to reduce molecular weight) is mixed with the compressed ethylene before the two are mixed/dissolved into the liquid feed. The total stream is cooled to the appropriate feed temperature (5° C.). The reactor operates at 525 psig and a control temperature equal to 105° C. The propylene conversion in the reactor is maintained by controlling the catalyst injection rate. The reaction temperature is maintained by controlling the water temperature across the shell side of the heat exchanger at 85° C. The residence time in the reactor is short, 10 minutes. The propylene conversion per reactor pass is 60 wt %.

Upon exiting the reactor, water and additive are injected into the polymer solution. The water hydrolyzes the catalyst, terminating the polymerization reaction. The additives consist of antioxidants, 500 ppm of Irganox™ 1010 and 1000 ppm of Irgafos™ 168, that remain with the polymer and act as stabilizers to prevent polymer degradation while in storage before subsequent fabrication at the end-user's facility. The post-reactor solution is super-heated from reactor temperature to 230° C. in preparation for a two-stage devolatilization. The solvent and unreacted monomers are removed during the devolatilization process. The polymer melt is pumped to a die for underwater pellet cutting.

Solvent and monomer vapors exiting the top of the devolatilizers are sent to a coalescer. The coalescer removes polymer entrained in the vapor during devolatilization. The clean vapor stream leaving the coalescer is partially condensed through a series of heat exchangers. The two-phase mixture enters a separation drum. The condensed solvent and monomers are purified (this is the recycle stream described above) and re-used in the reaction process. The vapors leaving the separating drum, mostly containing propylene and ethylene are sent to a block flare and burned. Propylene-ethylene copolymers made according to the above described process preferably are utilized for the propylene alpha olefin copolymers of the invention.

Polymer Resins Utilized in the Examples:

The resins used to make the monolayer films of the Examples are described below. The Melt Flow Rates of all the resins were measured in accordance with ASTM D 1238.

1. Linear low density polyethylene copolymer (LLDPE-1) commercially available from The Dow Chemical Company under the trademark DOWLEX NG 5056G has a Melt Index of 1.1 g/10 min@190° C. under a weight of 2.16 Kg, a density of 0.919 g/ml, contains 11 percent by weight units derived from 1-Octene comonomer, and is prepared using a Ziegler-Natta type catalyst using a solution polymerization process.

2. Linear low density polyethylene copolymer (LLDPE-2) commercially available from The Dow Chemical Company under the trademark DOWLEX 2042G has a Melt Index of 1.0 g/10 min@190° C. under a weight of 2.16 Kg, has a density of 0.930 g/ml, contains 6 percent by weight units derived from 1-Octene comonomer, and is prepared using a Ziegler-Natta type catalyst using a solution polymerization process.

3. RCP is a propylene-ethylene random copolymer made in a gas phase polymerization process using a supported Ziegler-Natta Catalyst system which is available from The Dow Chemical Company under the trade designation RandomPP R338-02N, which has a Melt Flow Rate of 2.0 g/10 minutes@230° C./2.16 kg., and contains 4.1 percent by weight units derived from ethylene comonomer. RCP has a molecular weight distribution (Mw/Mn) greater than 3.5.

4. P-E 1 is a propylene-ethylene copolymer made in a process similar to the solution loop polymerization process described above and has a Melt Flow Rate of 8 g/10 min@230° C./2.16 kg., a density of 0.888 g/cm3, and contains 5 wt % of ethylene comonomer. P-E 1 has a molecular weight distribution (Mw/Mn) of about 2.5.

5. P-E 2 is a propylene-ethylene copolymer made in a process similar to the solution loop polymerization process described above and has a Melt Flow Rate of 8 g/10 min@230° C./2.16 kg., a density of 0.876 g/cm$^3$, and contains 9 percent by weight ethylene comonomer. P-E 2 has a molecular weight distribution (Mw/Mn) of about 2.5.

6. P-E 3 is a propylene-ethylene copolymer made in a process similar to the solution loop polymerization process described above and has a Melt Flow Rate of 8 g/10 min@230° C./2.16 kg., a density of 0.866 g/cm$^3$, and contains 12 percent by weight units derived from ethylene. P-E 3 has a molecular weight distribution (Mw/Mn) of about 2.5.

Blending LLDPE's and P-E Copolymers

The desires LLDPE, P-E Copolymer, and RCP are blended prior to introduction into the blown film extruder as follows:

The desired LLLDPE, P-E Copolymer, and RCP are placed in a plastic drum according the weight percentages set forth in Table 1. The drum is covered with a plastic liner. The above drum is then sealed and loaded onto a tumble blender and tumbled for at least 45 minutes to ensure good mixing.

TABLE 1

| | Ex. 1 | Ex. 2 | Ex. 3 | CS. 1 | Ex. 4 | Ex. 5 | Ex. 6 | Ex 7 | CS 2 | CS 6 |
|---|---|---|---|---|---|---|---|---|---|---|
| LLDPE-1 Wt % | 90 | 90 | 90 | 90 | 95 | 70 | | | 100 | |
| LLDPE-2 Wt % | | | | | | | 90 | 70 | | 100 |
| P-E 1 Wt % | 10 | | | | | | | | | |
| P-E 2 Wt % | | 10 | | | 5 | 30 | 10 | 30 | | |
| P-E 3 Wt % | | | 10 | | | | | | | |
| RCP Wt % | | | | 10 | | | | | | |

Air Quenched Blown Film Production Method

The polymer composition set forth in Table 1 are manufactured into monolayer film structures in accordance with the following procedure: The polymer compositions are manufactured into monolayer film structures using a Covex 45 blown film extrusion line. This extrusion machine consists of an Oremor motor (Bk180m, 33 Kw), a 45 mm extruder utilizing a universal screw with an L/D ratio of 28:1 and an annular die with a diameter of 150 mm.

All films are produced with a die gap of 1.5 mm. The produced films are air blown to a 2.5:1 blow-up ratio (BUR) and air-quenched to produce the monolayer film. Typical polymer melt temperatures are targeted at 200° C./210° C./220° C./220° C./220° C. from inlet to outlet, with a target die temperature of 220° C. Typical extruder output rates are 22.5 kg/hr corresponding to an approximate screw speed of 65 rpm.

Monolayer Film Properties Test Methods:

Dart impact is measured in accordance with ISO 7765-1 (method A); Elmendorf tear is measured in accordance with ASTM D-1922-94a.

Gloss and haze are tested in accordance with ASTM D-2457 and ASTM D-1003 respectively.

Hot tack is used to express the seal force immediately after the sealing operation has taken place, before any cooling of the seal has taken place.

The hot tack initiation temperature of the films is measured using the "JB Instrument Hot Tack Test Method" which measures the force required to separate a heat seal before the seal has had a chance to fully cool (crystallize). The seal is formed by pressing one surface of the film against another surface of the same film specimen using the sealing time and pressure set forth below. This test simulates the filling of material into a pouch or bag before the seal has had a chance to completely cool. The "JB Instrument Hot Tack Test Method" is a test method using a JB Instrument Hot Tack Tester Type 3000 according to the following conditions:

| | |
|---|---|
| Specimen Width: | 15 mm |
| Sealing Time: | 0.5 seconds |

-continued

| | |
|---|---|
| Sealing Pressure: | 0.5 N/mm$^2$ |
| Delay Time: | 0.2 seconds |
| Peel Speed: | 200 mm/seconds |
| Number of Samples per Temperature | 5 |
| Temperature Increments: | 5° C. |

The film sample is tested at various temperatures from a low temperature to a high temperature. The hot tack initiation temperature is the lowest temperature at which a film specimen tested in accordance with the details provided above will be able to maintain a resistance force of at least 1N applied across the 15 mm wide specimen to separate the seal. The lower the hot tack initiation temperature, the wider the operating window on packaging form fill and seal equipment and/or the faster the packaging line can be operated. It is important that the inventive compositions, in addition to improved hot tack initiation temperature, also exhibits similar hot tack strength as the respective ethylene-based copolymer alone at temperatures above the hot tack initiation temperature.

The results of the film properties tests are recorded in Table 2. As can be seen from the results of Table 2:

The values of gloss for the films made from the inventive compositions are higher than the values for the comparative films made from polyethylene alone. And, the films made from the inventive compositions also exhibit lower hot tack initiation temperatures than films made from the polyethylene alone. Additionally, the Elmendorf Tear values for the films of Examples 1-4 and 6 are comparable to the values obtained from films made of a relevant polyethylene, alone. Further, the films of Examples 2,3, and 6 also exhibit comparable values of Dart impact relative to the polyethylene, alone. These data show that the use of a propylene-ethylene copolymer having from about 8 to 12 percent by weight units derived from ethylene is preferable to propylene-ethylene copolymer having lower levels of units derived from ethylene.

Examples 1-3 and 5 show both an improvement in both gloss (higher) and haze (lower) compared to a film made from solely from the polyethylene.

The comparative example made with a blend of RCP (CS-1) shows that a polymer having a lower level of units derived from ethylene and a broader molecular weight distribution (Mw/Mn) may slightly improve the gloss and hot tack of films made from the composition, but the physical properties are degraded to the extent that they, as a whole, are not comparable to a film made from the polyethylene alone.

The films of Examples 5 and 7 show that when a greater amount of propylene-ethylene copolymer is utilized, the resulting films will not only have improved values for gloss, but will also have significantly improved values for hot tack initiation temperature (a reduction of about 20° C. for Example 7 and a reduction of about 30° C. for Example 5) compared to the respective film made from polyethylene, alone.

TABLE 2

| Property | Ex. 1 | Ex. 2 | Ex. 3 | CS. 1 | Ex. 4 | Ex. 5 | Ex. 6 | Ex 7 | CS. 2 | CS 6 |
|---|---|---|---|---|---|---|---|---|---|---|
| Dart Impact (grams) | 326 | 465 | 549.5 | 294 | 407 | 269 | 189 | 141 | 552 | 215.5 |
| CD Elmendorf Tear (grams) | 1090 | 1170 | 1190 | 985 | 1110 | 1030 | 1020 | 944 | 1130 | 1020 |
| MD Elmendorf Tear (grams) | 984 | 986 | 1020 | 819 | 944 | 702 | 287 | 368 | 1030 | 260 |
| Gloss | 64.02 | 64.1 | 65.5 | 56.86 | 65.4 | 66.52 | 43.64 | 48 | 47.5 | 37 |
| Haze % | 8.82 | 9.4 | 9.5 | 11.4 | 9.86 | 7.73 | 14.9 | 14.5 | 9.7 | 13.6 |
| Hot Tack Initiation Temperature (° C.) | 87 | 85 | 85 | 95 | 94 | 66 | 103 | 98 | 97 | 118 |

We claim:

1. An air quenched blown monolayer film, the film comprising:
    (A) from 2-15% by weight of a propylene-based copolymer having substantially isotactic propylene sequences, the propylene-based copolymer consisting of propylene and from about 8 to about 21 mol % of units derived from ethylene, the propylene-based copolymer having $^{13}$C NMR peaks corresponding to a regio-error at about 14.6 and about 15.7 ppm, the peaks of about equal intensity, a melt flow rate of at least 5 g/10 min to about 8 g/10 min as measured in accordance with ASTM D-1238 at 230° C./2.16 kg; and
    (B) from about 85% to about 98% by weight of a heterogeneous linear low density polyethylene having a melt index of from 0.1 to 9 g/10 min as measured in accordance with ASTM D-1238 at 190° C./2.16 kg;
    wherein the film exhibits (i) a value of gloss greater than a value of gloss for (iii) and (ii) a value of haze less than a value of haze for (iii) exhibited by (iii) an air quenched blown film made from the linear low density polyethylene of (B), alone.

2. The air quenched blown monolayer film of claim 1, wherein the propylene-based copolymer has a molecular weight distribution (Mw/Mn) of less than 3.5.

3. The air quenched blown monolayer film of claim 2, wherein the film exhibits comparable physical properties of Elmendorf tear strength and of dart impact as exhibited by the air quenched blown film made solely from component B.

4. The air quenched blown monolayer film of claim 3, wherein the air quenched blown film made from the composition further exhibits a value for hot tack initiation temperature lower than the value for hot tack initiation temperature exhibited by the air quenched blown film made solely from component B.

5. The air quenched blown monolayer film of claim 4, wherein the propylene-based copolymer consists of a propylene-ethylene copolymer having from 8 to 12 percent by weight units derived from ethylene.

6. The air quenched blown monolayer film of claim 5, wherein the monolayer film exhibits a value of haze lower than the value of haze exhibited by the air quenched blown film made from component B, alone.

7. The air quenched blown monolayer film of claim 1 having a haze value from about 8% to less than about 15% as measured in accordance with ASTM D-1003.

8. The air quenched blown monolayer film of claim 1 wherein the propylene-based polymer is a propylene/ethylene copolymer with from 8 wt % to 12 wt % units derived from ethylene.

9. The air quenched blown monolayer film of claim 1 wherein the linear low density polyethylene is an ethylene/octene copolymer.

10. The air quenched blown monolayer film of claim 1 wherein the linear low density polyethylene has a density from about 0.910 g/cc to about 0.930 g/cc.

* * * * *